(12) United States Patent
Liu et al.

(10) Patent No.: US 10,215,942 B2
(45) Date of Patent: Feb. 26, 2019

(54) HIGH-TEMPERATURE RESISTANT AND SMALL-DIAMETER OPTICAL CABLE AND PREPARATION METHOD THEREOF

(71) Applicant: Hengtong Optic-electric Co., Ltd., Suzhou (CN)

(72) Inventors: Peidong Liu, Suzhou (CN); Peng Cao, Suzhou (CN); Zengqiang Zhang, Suzhou (CN); Jicheng Yin, Suzhou (CN); Chuanwu Xuan, Suzhou (CN); Junxiong Wu, Suzhou (CN); Xinhua Shen, Suzhou (CN); Qiang Li, Suzhou (CN); Hongzhou Pan, Suzhou (CN); Di Wu, Suzhou (CN); Zhongkai Wang, Suzhou (CN); Shan Xu, Suzhou (CN); Lihua Sun, Suzhou (CN)

(73) Assignee: HENGTONG OPTIC-ELECTRIC CO., LTD., Suzhou (CN)

( * ) Notice: Subject to any disclaimer, the term of this patent is extended or adjusted under 35 U.S.C. 154(b) by 0 days.

(21) Appl. No.: 15/848,530

(22) Filed: Dec. 20, 2017

(65) Prior Publication Data

US 2018/0129003 A1    May 10, 2018

Related U.S. Application Data

(63) Continuation of application No. 15/557,571, filed as application No. PCT/CN2016/104315 on Nov. 2, 2016.

(30) Foreign Application Priority Data

Nov. 23, 2015    (CN) .......................... 2015 1 0817681

(51) Int. Cl.
*G02B 6/44*    (2006.01)
(52) U.S. Cl.
CPC ................................ *G02B 6/4436* (2013.01)
(58) Field of Classification Search
CPC ................................................ G02B 6/4436
See application file for complete search history.

(56) References Cited

U.S. PATENT DOCUMENTS 4,553,815 A * 11/1985 Martin ................ B29C 47/0016
385/102
4,718,747 A *  1/1988 Bianchi ................ G02B 6/4401
385/103
4,740,055 A *  4/1988 Kanda .................... C03C 25/106
385/128

(Continued)

FOREIGN PATENT DOCUMENTS

WO    WO 2012084200 A1 *  6/2012 .............. C08J 7/047

*Primary Examiner* — Rhonda S Peace

(57) ABSTRACT

The present disclosure discloses a high-temperature resistant and small-diameter optical cable and a preparation method thereof. The high-temperature resistant and small-diameter optical cable is prepared by using acrylate as a coating material, using PHB/PET liquid crystal copolyester as an outer protective layer material and using an extrusion process. Compared to traditional optical cables, the novel optical cable has advantages in small diameter, low loss attenuation, good microbending property, excellent mechanical property, long one-time finished length (10 km~26 km), long storage time, simple preparation process and wide operating temperature range.

8 Claims, 2 Drawing Sheets

(56) References Cited

U.S. PATENT DOCUMENTS

| | | | |
|---|---|---|---|
| 6,173,102 B1* | 1/2001 | Suzuki | C03C 25/1065 |
| | | | 385/126 |
| 2018/0129003 A1* | 5/2018 | Liu | G02B 6/4436 |

* cited by examiner

HIGH-TEMPERATURE RESISTANT AND SMALL-DIAMETER OPTICAL CABLE AND PREPARATION METHOD THEREOF

RELATED APPLICATIONS

This application is a continuation of U.S. patent application Ser. No. 15/557,571, filed Sep. 12, 2017, which is a U.S. National Stage Application filed under 35 U.S.C. § 371 of PCT Application Number PCT/CN2016/104315, filed Nov. 2, 2016, which claims the benefit of Chinese Patent Application No. 201510817681.5, filed Nov. 23, 2015. The entire contents of each of the above-identified patent applications are incorporated herein by reference.

TECHNICAL FIELD

The present disclosure relates to the technical field of guidance optical cable, and more particularly, to a novel guidance optical cable and a preparation method thereof.

BACKGROUND

Usually, metallic guidewires are used as information transmission medium. With the rapid development of optical cable technologies, the optical cable information sensing technologies have a tendency to substitute the metallic guidewires for advantages in many aspects, thus becoming a research focus. By using an optical cable as an information transmission medium, a high-temperature resistant sensing optical cable is used for implementing information transmission, and is good in high temperature resistance, simple in structure, strong in antijamming capability, and flexible in use, etc.

At present, factors restricting further development of the high-temperature resistant optical cables are as follows: optical cable manufacturing technologies, and preparation of optical cables good in microbending property, high in tensile strength, long in single-cable length, low in wear, good in fatigue resistance and long in storage period is the most important. Transmission properties, mechanical properties and environmental properties of the optical fibers mainly depend on properties of the coatings and outer protective layer materials. Therefore, it is of vital importance to select proper coating and outer protective layer materials. The traditional high-temperature resistant and sensing optical cables are formed by weaving or coating the surface of the optical fibers with organdy or aramid yarn and then performing thermocuring or ultraviolet (UV) curing. The optical cables prepared by this method are large in outer diameter and complicated in process, and thus have no practical applicability.

When common optical cable outer protective layer materials such as polyethylene and polrvinyl chloride are very thin in thickness (for example, 0.1 mm), they are poor in antiaging capability and fragile at low temperature. Although low-temperature properties of materials good in antiaging capability, such as nylon, are improved, a thermal expansion coefficient thereof is up to $10^{-4}/T$, two orders of magnitude higher than that ($10^{-6}/T$) of the optical fiber, which causes the optical cables to generate great microbending loss at low temperature.

Therefore, it is urgent for the inventor of the present disclosure to design a new technology to solve these problems.

SUMMARY

The present disclosure aims to provide a high-temperature resistant and small-diameter optical cable and a preparation method thereof. The prepared optical cable is small in diameter, low in loss, excellent in mechanical property, simple in preparation process, and wide in operating temperature range, etc.

To solve the above technical problems, the present disclosure provides following technical solutions:

A high-temperature resistant and small-diameter optical cable including an optical fiber, a coating and an outer protective layer, wherein the coating is an acrylic resin layer, and the outer protective layer is a PET/PHB liquid crystal copolyester layer of liquid crystal polymer material.

Preferably, the optical fiber is a G657B-type optical fiber, and has a diameter of 0.125±0.01 mm and a minimum bending radius selected one from 10 mm, 7.5 mm or 5 mm.

Preferably, a thickness of the coating is between 0.013 mm and 0.017 mm.

Preferably, an outer diameter of the optical cable is between 0.31 mm and 0.33 mm.

Preferably, an operating temperature range of the optical cable ranges from −50° C. to 200° C.

A preparation method of the above high-temperature resistant and small-diameter optical cable including the following steps:

S1: coating a layer of acrylic resin on an outer surface of an optical fiber;
S2: paying the optical fiber out;
S3: preheating the optical fiber at a preheating temperature of 150° C.~230° C.;
S4: extrusion moulding by means of an extrusion die, wherein an outer protective layer is a PET/PHB liquid crystal copolyester layer of liquid crystal polymer material;
S5: softening the optical cable;
S6: cooling the optical cable;
S7: pulling the optical cable;
S8: winding up; and
S9: sample detection.

Preferably, before use, the PET/PHB liquid crystal copolymer is placed in a drying oven for drying treatment at a drying temperature of 120° C. for 5 h.

Preferably, a one-time finished length of the optical cable ranges from 10 km to 26 km.

Preferably, the extrusion machine is a screw extruder.

By adopting the above technical solutions, the present disclosure includes at least the following beneficial effects:

A high-temperature resistant and small-diameter optical cable and a preparation method thereof according to the present disclosure, the high-temperature resistant and small-diameter optical cable is prepared by using acrylate as a coating material, using PHB/PET liquid crystal copolyester as an outer protective layer material and using an extrusion process. Compared to traditional optical cables, the novel guidance optical cable is good in high temperature resistance, small in diameter, low in loss, good in microbending property, excellent in mechanical property, long in one-time finished length (10 km~26 km), long in storage time, simple in preparation process, and wide in operating temperature range, etc.

Figure 1:
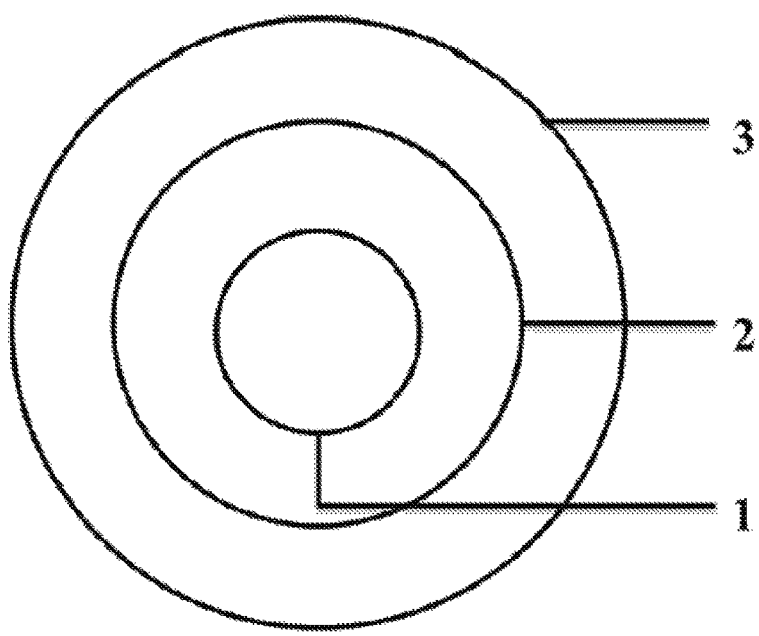
FIG. 1 is a schematic structural diagram of a high-temperature resistant and small-diameter optical cable according to the present disclosure.

REFERENCE NUMERALS 1. optical fiber
2. coating
3. outer protective layer

DETAILED DESCRIPTION OF THE EMBODIMENTS

Technical solutions in the embodiments of the present disclosure will be described clearly and completely below, in conjunction with the accompanying drawings in the embodiments of the present disclosure. Apparently, the described embodiments are merely some but not all of the embodiments of the present disclosure. All other embodiments obtained by those skilled in the art based on the embodiments of the present disclosure without creative efforts shall fall within the protection scope of the present disclosure.

Embodiment 1

As shown in FIG. 1, a high-temperature resistant and small-diameter optical cable in accordance with this embodiment includes an optical fiber 1, a coating 2 and an outer protective layer 3, wherein the coating 2 is an acrylic resin layer, and the outer protective layer 3 is a PHB/PET liquid crystal copolyester layer of liquid crystal polymer material. The acrylic resin layer not only can protect the surface of the optical fiber 1 from moist gases and scratching due to external forces, but also can impart the optical fiber 1 with improved microbending resistance property, thereby reducing microbending additional loss function of the optical fiber 1. Meanwhile, the acrylic resin layer is simple in coating process, good in stability, good in compatibility of the optical fiber 1 and the PHB/PET liquid crystal copolymer of the outer protective layer 3 material, and firm in bonding an interface between layers, thereby better protecting the optical fiber 1. The material of the outer protective layer 3 employs the PHB/PET liquid crystal copolymer which has high strength, high modulus, high thermal resistance, tiny linear expansion coefficient and good melting machinability. When thin-layer extrusion is carried out on the surface of the optical fiber 1 to prepare a small-diameter optical cable, the mechanical property and the temperature characteristic of the optical cable are ensured, and the demand of the optical cable is met.

Preferably, the optical fiber 1 is a G657B-type optical fiber 1, and has a diameter of 0.125±0.01 mm and a minimum bending radius selected one from 10 mm, 7.5 mm or 5 mm.

Preferably, a thickness of the coating 2 is between 0.013 mm and 0.017 mm.

Preferably, an outer diameter of the high-temperature resistant and small-diameter optical cable is between 0.31 mm and 0.33 mm.

Preferably, an operating temperature range of the high-temperature resistant and small-diameter optical cable ranges from −50° C. to 200° C.

As is well known, a liquid crystal polymer is a polymer having special properties developed in recent years. The liquid crystal polymer has the following excellent properties: 1. excellent mechanical properties, high strength and high modulus; 2. prominent thermal resistance and wide operating temperature range (−60° C.~80° C.); 3. excellent flame retardance up to a grade of UL-94V-0, being one of plastics having the best flameproof safety; 4. good melting flowability and good moulding machinability; 5. tiny linear expansion coefficient and high dimensional precision, the linear expansion coefficient of the liquid crystal polymer ($5\times10^{-6}$/° C.) is two orders of magnitude smaller than that of nylon ($5\times10^{-4}$/° C.) and substantially matches with the linear expansion coefficient of the optical fiber 1, and water absorption is 0.02~0.08, which is ranked lowly in water absorptions of thermal plastics; and 6. prominent chemical corrosion resistance. As an inactive substance, the liquid crystal polymer is hardly corroded by all the industrial solvents, fuel oils, detergents, hot water, 90% acid and 50% alkali at a high temperature range, and does not generate stress cracking under the action of the solvents. In view of all the above characteristics, it is found that there is a possibility that the liquid crystal macromolecule becomes the outer layer material of the optical fiber 1, especially in preparation of small-diameter optical cables.

The PET/PHB liquid crystal copolymer is the earliest reported polymer having thermotropic liquid crystallinity, and has excellent properties such as high strength, high modulus, high thermal resistance, small linear expansion coefficient and good melting machinability. Therefore, in this embodiment, the high-temperature resistant and small-diameter optical cable is prepared by using acrylate as the material of the coating 2, using PHB/PET liquid crystal copolyester as the material of the outer protective layer 3 and using the extrusion process. Compared to the traditional optical cables, the novel guidance optical cable is small in diameter, high in strength, small in deformation at high and low temperature, good in flame retardation property, good in microbending property, low in loss, wide in operating temperature range, and simple in preparation process.

Embodiment 2

Figure 2:
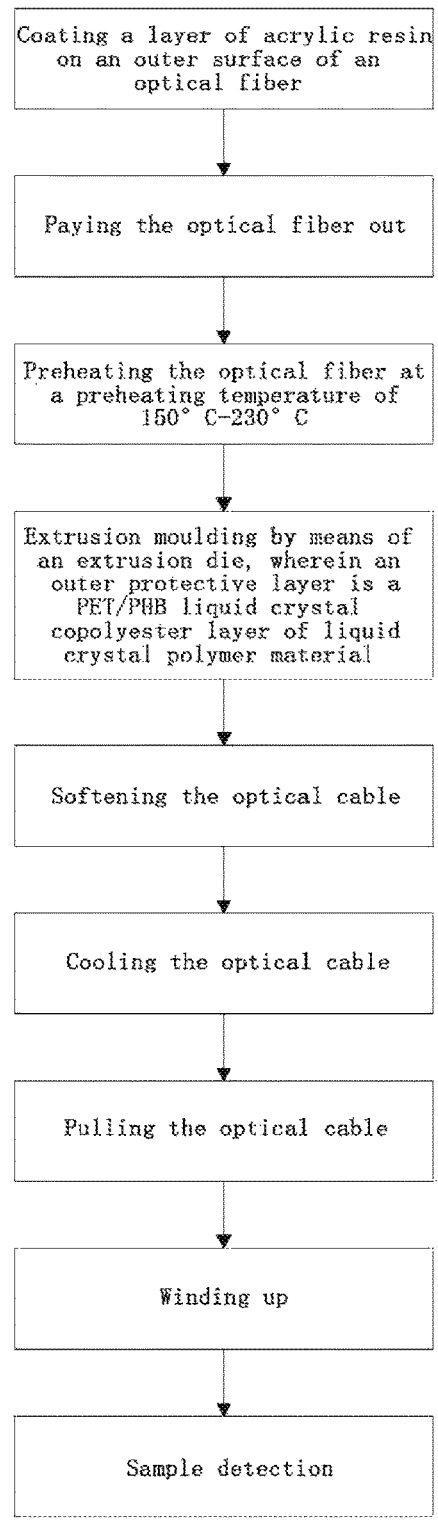
FIG. 2 is a flowchart of a preparation method of the high-temperature resistant and small-diameter optical cable according to the present disclosure.

As shown in FIG. 2, a preparation method of the high-temperature resistant and small-diameter optical cable according to the Embodiment 1 includes the following steps:

S1: coating an outer surface of an optical fiber with a layer of acrylic resin, specifically coating a surface of a bare optical fiber with an acrylic resin layer having a thickness of 0.013 mm~0.017 mm by means of a pressure coater in the process of downward drawing the optical fiber. The temperatures of the acrylic resin and a mould in the pressure coater are 45° C.~60° C., the whole mould consists of a guide die, a die and a plug die, each of which has high machining precision. As an optical fiber surface coating material, the acrylic resin is simple in coating process, good in stability, good in compatibility of the optical fiber and the PET/PHB liquid crystal copolymer of the outer protective layer material, and firm in bonding an interface between layers, thereby better protecting the optical fiber.

S2: paying the optical fiber out, preferably by means of a pay-out unit. The pay-out unit consists of a pay-out spool, a pay-out tension regulating wheel and a display. The rotation speed of the pay-out spool is completely driven and controlled by the tension wheel. The back of the tension regulating wheel is connected to an air damping cylinder. Air pressure in the cylinder can be immediately regulated as required, pay-out tensions correspondingly vary, and values thereof can be read from the display in real time. 12 pay-out tensions can be regulated independently. A static eliminator is arranged at an outlet of each pay-out unit to eliminate electrostatic charges on the optical fibers, thereby avoiding mutual attraction or repulsion of charges between optical fibers, and ensuring the optical fibers to be arranged orderly and then enter the mould.

S3: preheating the optical fiber at a preheating temperature of 150° C.~230° C., a main purpose thereof is to improve the stability of the optical fiber and enhance the bonding of the PET/PHB liquid crystal copolymer of the outer protective layer material.

S4: carrying out extrusion moulding by means of an extrusion mould, wherein the outer protective layer is a PET/PHB liquid crystal copolyester layer of liquid crystal polymer material; the outer protective layer material employs the PET/PHB liquid crystal copolymer which has high strength, high modulus, high thermal resistance, tiny linear expansion coefficient and good melting machinability. When thin-layer extrusion is carried out on the surface of the optical fiber to prepare a small-diameter optical cable, the mechanical properties and the temperature characteristics of the optical cable are ensured and the demands for the optical cable are met.

S5: softening the optical cable;

S6: cooling the optical cable, the effect thereof is to sufficiently cool, solidify and harden an optical cable sheath extruded from the mould. Cooling the optical cable is implemented by adopting double-stage heat and cold water, etc. The optical cable is not completely cooled after being extruded from the mould. No further cooling the optical cable will cause the optical cable to be deformed. Therefore, the optical cable should be cooled to room temperature as much as possible by a cooling device. The cooling device has two cooling methods: a dipping bath type cooling method for a small-caliber tube; and a spray-type cooling method for a large-section tube. This embodiment adopts the former method.

S7: pulling the optical cable, a pulling speed is generally faster than an extrusion speed by 1%-10% to uniformly pull the extruded optical cable out. The pulling speed may regulate the section size of the optical cable sheath to a certain degree and have a certain effect on production efficiency. In this embodiment, preferably an optical cable pulling wheel is used to pull.

S8: winding up; preferably winding up is implemented by a wind-up device, wherein the wind-up device consists of a wind-up control interface (including an x-y geometrical measurement instrument), a wind-up spool, a wind-up tension regulator, a winding displacement guide wheel and the like. The wind-up device is provided with an independent control panel which can be used for setting the size of a wire coil, winding displacement pitches, winding displacement manners and the like.

S9: sample detection, which includes but is not limited to appearance detection and performance detection.

Preferably, before use, the PET/PHB liquid crystal copolymer is placed in a drying oven for drying treatment at a drying temperature of 120° C. for 5 h.

Preferably, a one-time finished length of the high-temperature resistant and small-diameter optical cable ranges from 10 km to 26 km.

Preferably, the extrusion machine is a screw extruder.

In this embodiment, the high-temperature resistant and small-diameter optical cable is prepared by using acrylate as a coating material, using PHB/PET liquid crystal copolyester as an outer protective layer material and using an extrusion process. Compared to traditional optical cables, the novel guidance optical cable is small in diameter, low in loss, good in microbending property, excellent in mechanical property, long in one-time finished length (10 km-26 km), long in storage time, simple in preparation process, and wide in operating temperature range, etc.

The foregoing description of the disclosed embodiments enables those skilled in the art to implement or use the present disclosure. Various modifications of these embodiments will be apparent to those skilled in the art. A general principle defined herein may be implemented in other embodiments without departing from the spirit or scope of the present disclosure. Therefore, the present disclosure will not be limited to these embodiments as shown herein, instead it is in conformity with the widest scope consistent with the principle and novel features disclosed herein.

What is claimed is:

1. A high-temperature resistant and small-diameter optical cable, comprising:
    an optical fiber, a coating and an outer protective layer;
    wherein the coating is an acrylic resin layer, and the outer protective layer is a PET/PHB liquid crystal copolyester layer of liquid crystal polymer material, and
    wherein the high-temperature resistant and small-diameter optical cable is prepared by a method comprising:
    S1: coating a layer of acrylic resin on an outer surface of an optical fiber;
    S2: paying the optical fiber out;
    S3: preheating the optical fiber at a preheating temperature of 150° C.~230° C.;
    S4: extrusion moulding by means of an extrusion die, wherein an outer protective layer is a PET/PHB liquid crystal copolyester layer of liquid crystal polymer material;
    S5: softening the optical cable;
    S6: cooling the optical cable by a dipping bath type cooling method;
    S7: pulling the optical cable;
    S8: winding up; and
    S9: sample detection.

2. The high-temperature resistant and small-diameter optical cable according to claim 1, wherein the optical fiber is a G657B-type optical fiber, having a diameter of 0.125±0.01 mm and a minimum bending radius selected one from 10 mm, 7.5 mm or 5 mm.

3. The high-temperature resistant and small-diameter optical cable according to claim 1, wherein a thickness of the coating is between 0.01 mm and 0.02 mm.

4. The high-temperature resistant and small-diameter optical cable according to claim 1, wherein an outer diameter of the optical cable is between 0.5 mm and 1 mm.

5. The high-temperature resistant and small-diameter optical cable according to claim 1, wherein an operating temperature range of the optical cable ranges from −50° C. to 200° C.

6. The high-temperature resistant and small-diameter optical cable according to claim 1, wherein before use, the PET/PHB liquid crystal copolymer is placed in a drying oven for drying treatment at a drying temperature of 120° C. for 5 h.

7. The high-temperature resistant and small-diameter optical cable according to claim 1, wherein a one-time finished length of the high-temperature resistant and small-diameter optical cable ranges from 10 km to 26 km.

8. The high-temperature resistant and small-diameter optical cable according to claim 1, wherein the extrusion machine is a screw extruder.

* * * * *